(12) United States Patent
Kato

(10) Patent No.: US 6,539,001 B1
(45) Date of Patent: Mar. 25, 2003

(54) VISUAL TELEPHONE APPARATUS AND DATA COMPRESSION MULTIPLEXING METHOD THEREFOR AS WELL AS RECORDING MEDIUM ON WHICH DATA COMPRESSION MULTIPLEXING CONTROL PROGRAM IS RECORDED

(75) Inventor: Tatsuya Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/116,355

(22) Filed: Jul. 16, 1998

(30) Foreign Application Priority Data

Jul. 16, 1997 (JP) .............................. 9-190335

(51) Int. Cl.⁷ .......................... H04Q 11/00; H04L 12/16
(52) U.S. Cl. ....................... 370/271; 370/459; 370/465; 370/468; 370/535; 348/14.01; 348/14.13; 348/384.1; 348/461; 348/462; 348/465; 386/98
(58) Field of Search ........................... 348/14.01, 14.13, 348/384.1, 461, 462, 465; 358/426; 370/271, 458, 459, 465, 468, 473, 477, 498, 522, 535, 537, 542, 545; 382/282; 386/95, 96, 98

(56) References Cited

U.S. PATENT DOCUMENTS

| | | | | |
|---|---|---|---|---|
| 5,182,642 A | * | 1/1993 | Gersdorff et al. ............ | 358/133 |
| 5,543,939 A | * | 8/1996 | Harvey et al. ............... | 358/426 |
| 5,550,593 A | * | 8/1996 | Nakabayashi ................ | 348/465 |
| 5,781,788 A | * | 7/1998 | Woo et al. .............. | 395/800.01 |
| 5,963,246 A | * | 10/1999 | Kato ........................... | 348/15 |
| 5,999,985 A | * | 12/1999 | Sebestyen .................... | 709/247 |
| 6,031,563 A | * | 2/2000 | Nishiura ....................... | 348/14 |
| 6,052,148 A | * | 4/2000 | Morshita ..................... | 348/384 |
| 6,236,805 B1 | * | 5/2001 | Sebestyen .................... | 386/98 |
| 6,259,816 B1 | * | 7/2001 | Kato ........................... | 382/236 |

FOREIGN PATENT DOCUMENTS

| | | |
|---|---|---|
| JP | 61198941 | 2/1985 |
| JP | 1180153 | 1/1988 |
| JP | 1189274 | 1/1988 |
| JP | 4291892 | 3/1991 |
| JP | 514524 | 7/1991 |
| JP | 6216779 | 1/1992 |
| JP | 5-64175 | 3/1993 |
| JP | 6-22310 | 1/1994 |
| JP | 7-99652 | 4/1995 |
| JP | 7095551 | 4/1995 |
| JP | 7284078 | 10/1995 |
| JP | 8-9067 | 1/1996 |
| JP | 8-84326 | 3/1996 |

OTHER PUBLICATIONS

Japanese Office Action issued Oct. 17, 2000 in a related application with English translation of relevant portions.

* cited by examiner

*Primary Examiner*—Hassan Kizou
*Assistant Examiner*—Joe Logsdon
(74) *Attorney, Agent, or Firm*—Dickstein, Shapiro, Morin & Oshinsky LLP

(57) ABSTRACT

The invention provides a visual telephone apparatus which can assure a high speed of response of a user data application. An image compression section compresses an image signal imaged by a video camera with an image compression ratio based on control information from a terminal control section. A speech compression section compresses a speech signal collected by a microphone with a speech compression ratio based on control information from the terminal control section. The terminal control section produces such control information based on keyboard input data from a keyboard, mouse input data from the mouse and common application operation information from a computer. A multiplexer multiplexes transmission compressed image data and transmission compressed speech data based on the control information outputted from the terminal control section and outputs transmission multiplexed data to a line interface.

41 Claims, 9 Drawing Sheets

VISUAL TELEPHONE APPARATUS AND DATA COMPRESSION MULTIPLEXING METHOD THEREFOR AS WELL AS RECORDING MEDIUM ON WHICH DATA COMPRESSION MULTIPLEXING CONTROL PROGRAM IS RECORDED

BACKGROUND OF THE INVENTION

1. Field of the Invention

The present invention relates to a visual telephone apparatus and a data compression multiplexing method therefor as well as a recording medium on which a data compression multiplexing control program is recorded, and more particularly to a method for compression production of image or speech data for a visual telephone apparatus and for multiplexing of compression image data, compression speech data and user data.

2. Description of the Related Art

Conventionally, a visual telephone apparatus of the type mentioned (also called television telephone, picturephone and so forth) is used in order to communicate images, speech and user data such as an electronic file over a common public network as recited, for example, in the TTC standards (draft) JT-H324 of a material for the $23^{rd}$ standardization conference by the Telecommunication Technology Committee.

Referring to FIG. 9, there is shown in block diagram an exemplary one of conventional visual telephone apparatus. A video I/O (input/output) apparatus 31 images a person who is in front of the visual telephone apparatus 30, and outputs an image signal obtained by the imaging. A video encoder 32 compresses the image signal inputted thereto from the video I/O apparatus 31 and outputs a resulting compressed image signal.

An audio I/O apparatus 33 collects speech of a person who is in front of the visual telephone apparatus 30, and outputs the collected speech signal. An audio encoder 34 compresses the speech signal outputted from the audio I/O apparatus 33 and outputs a resulting compressed speech signal. A reception path delay section 35 produces, from a difference between the processing time for image compression and the processing time for speech compression, a delay for preventing a time difference from being produced between outputting of speech and displaying of an image.

A user data application 36 is a télématique apparatus like a computer which outputs user data and may be, for example, such a shared white board as shown in FIG. 8. Referring to FIG. 8, in the shared white board, for example, if an expression "one, to, three, four" is inputted to a white board 22 of a terminal B using a pen 22a, then the expression "one, to, three, four" of the white board 22 of the terminal B is displayed on a white board 21 of another terminal A, and that the term "to" is wrong can be pointed out from the terminal B by placing an underline below the word "to" using a pen 21a of the terminal A. In this manner, a white board is shared by the terminals A and B.

Referring back to FIG. 9, a data protocol section 37 performs framing of user data outputted from the user data application 36. A system controller 38 develops an instruction of negotiation with the other party visual telephone apparatus (not shown) and an instruction for modem control. A control protocol section 39 converts the instruction of negotiation of the control protocol section 39 to predetermined protocol data.

An SRP (Simple Retransmission Protocol) or LAPM (Link Access Protocol for Modems) (SRP/LAPM) procedure section 40 performs a retransmission procedure for protocol data outputted from the control protocol section 39. A multiplexer/demultiplexer 41 multiplexes compressed image data outputted from the video encoder 32, compressed speech data outputted from the reception path delay section 35, user data outputted from the data protocol section 37 and protocol data outputted from the SRP/LAPM procedure section 40, and outputs resulting multiplexed data.

A modem 42 outputs the multiplexed data outputted from the multiplexer/demultiplexer 41 to a GSTN (General Switched Telephone Network) network 44. A modem controller 43 controls the modem 42 in accordance with a modem control instruction outputted from the system controller 38. An MCU (Multipoint Control Unit) 45 performs control when visual telephone communication is performed at multiple points.

In operation, referring to FIG. 9, as an initial condition, the system controller 38 issues a modem control instruction to the modem controller 43, and the modem 42 which receives the modem control instruction performs communication originating processing to the other party visual telephone apparatus or MCU 45.

If a communication channel is established through the GSTN network 44, then the system controller 38 issues an instruction of negotiation with the other party terminal to the control protocol section 39. The control protocol section 39 produces protocol data from the negotiation instruction.

The protocol data are subject to a retransmission procedure by the SRP/LAPM procedure section 40 and then multiplexing processing by the multiplexer/demultiplexer 41, whereafter they are transferred to the other party visual telephone apparatus over the GSTN network 44 by the modem 42. By this operation, matching with regard to the capacity and so forth is established between the visual telephone apparatus 30 and the other party visual telephone apparatus. After the matching operation is completed, a communication condition is entered.

In the communication condition, the video encoder 32 performs compression processing for an image imaged by the video I/O apparatus 31 and outputs a resulting compressed image signal. Simultaneously, the audio encoder 34 performs compression processing for speech collected by the audio I/O apparatus 33 and outputs resulting compressed speech data.

On the transmission side, the reception path delay section 35 outputs the compressed speech data as they are. User data outputted from the user data application 36 such as a shared white board are subject to framing processing by the data protocol section 37.

Further, an instruction for mode setting or the like outputted from the system controller 38 in accordance with a situation is converted into protocol data by the control protocol section 39 and then subject to a retransmission procedure by the SRP/LAPM procedure section 40 so that control protocol data are outputted. The multiplexer/demultiplexer 41 here performs multiplexing processing of media for the compressed image data outputted from the video encoder 32, the compressed speech data outputted from the reception path delay section 35, the framed user data outputted from the data protocol section 37 and the control protocol data outputted from the SRP/LAPM procedure section 40 in accordance with a situation, and outputs resulting multiplexed data.

The multiplexed data are transferred to the other party visual telephone apparatus over the GSTN network 44 from the modem 42. The multiplexed data received at the modem 42 from the visual telephone apparatus of the originating party are demultiplexed into compressed image data, compressed speech data, user data and control protocol data, which are outputted to the video encoder 32, reception path delay section 35, data protocol section 37 and SRP/LAPM procedure section 40, respectively. The video encoder 32 performs decompression processing for the compressed image data and outputs a resulting image signal. The image signal is displayed by the video I/O apparatus 31.

The reception path delay section 35 performs delaying processing for compensating for a synchronism displacement between the image and the speech which is produced from a difference between the processing time for coding of the image data and the processing time for coding of the speech data. The compressed speech data outputted from the reception path delay section 35 with the synchronism displacement thereof compensated for are subject to decompression processing by the audio encoder 34 so that they are converted into a speech signal. The speech signal is outputted as speech by the audio I/O apparatus 33.

The data protocol section 37 performs deframing processing for the framed user data received from the multiplexer/demultiplexer 41 and outputs resulting user data. The user data are processed by the user data application 36. Meanwhile, the control protocol data outputted from the multiplexer/demultiplexer 41 are subject to processing of a retransmission procedure by the SRP/LAPM procedure section 40 and are then converted into an instruction for mode setting or the like by the control protocol section 39. The instruction is processed by the system controller 38.

In the conventional visual telephone apparatus described above, normally an image and speech are communicated with a visual telephone apparatus of the other party, and bands for the image and the speech are secured preferentially by the multiplexer/demultiplexer. Thereupon, if the user data application operates to output a large amount of user data, then if, upon multiplexing, the bands for image and speech data are secured preferentially in a usual manner, then the band for user data cannot be secured. Consequently, the throughput of the user data becomes low, and as a result, the speed of response of the user data application becomes low.

Further, usually the image compression section determines the compression ratio for image compression in accordance with a parameter set in advance by an operation of a user before visual telephone communication is started. In this instance, although the user data application outputs a large amount of user data, if the multiplexer/demultiplexer sets the band for image data to a comparatively narrow band to raise the throughput of user data, then the throughput of the compressed image data is deteriorated, and this results in such a bad effect as degradation of the frame rate of regenerated images.

Also, usually the speech compression section determines the compression ratio for speech compression in accordance with a parameter set in advance by an operation of the user before visual telephone communication is started. In this instance, although the user data application outputs a large amount of user data, if the multiplexer/demultiplexer sets the band for speech data to a comparatively narrow band to raise the throughput of user data, then the throughput of compressed speech data is deteriorated, and this results in such a bad effect as interruption of regenerated sound.

SUMMARY OF THE INVENTION

It is an object of the present invention to provide a visual telephone apparatus and a data compression multiplexing method therefor as well as a recording medium having a data compression multiplexing control program recorded thereon wherein a high speed of response of a user data application can be secured.

It is another object of the present invention to provide a visual telephone apparatus and a data compression multiplexing method therefor as well as a recording medium having a data compression multiplexing control program recorded thereon wherein a band for user data in multiplexing can be set freely so that the band for user data can be secured preferentially and a comparatively high speed of response of a user data application can be secured.

It is a further object of the present invention to provide a visual telephone apparatus and a data compression multiplexing method therefor as well as a recording medium having a data compression multiplexing control program recorded thereon wherein the compression ratio for image compression can be set freely so that a comparatively narrow band can be set to image data in multiplexing while the band for user data can be secured preferentially and a comparatively high speed of response of a user data application can be secured.

It is a still further object of the present invention to provide a visual telephone apparatus and a data compression multiplexing method therefor as well as a recording medium having a data compression multiplexing control program recorded thereon wherein the compression ratio for speech compression can be set freely so that a comparatively narrow band can be allocated to speech data in multiplexing while the band for user data can be secured preferentially and a comparatively high speed of response of a user data application can be secured.

In order to attain the objects described above, according to an aspect of the present invention, there is provided a visual telephone apparatus, comprising speech compression means for compressing speech to be sent out to an object apparatus of communication, image compression means for compressing an image to be sent out to the object apparatus of communication, a user data application for producing data including at least character information to be sent out to the object apparatus of communication, inputting means for inputting the data to the user data application, multiplexing means for multiplexing the speech compressed by the speech compression means, the image compressed by the image compression means and the data produced by the user data application and sending out resulting multiplexed data to the object apparatus of communication, first detection means for detecting whether or not the user data application is operating, second detection means for detecting, when it is detected by the first detection means that the user data application is operating, an amount of input data inputted from the inputting means per unit time set in advance, and means for producing band control information for setting a band to be allocated to the data produced by the user data application in response to a result of the detection of the second detection means and outputting the band control information to the multiplexing means.

In the visual telephone apparatus, the ratio of bands to be allocated to user data and compressed image and speech data in multiplexing is variably set depending upon whether or not the user data application is operating and based on the input data amount of the inputting means such as a keyboard and/or a mouse per unit time.

More particularly, it is detected whether or not the user data application is operating, and the input data amount inputted from the inputting means per unit time is detected.

Then, in response to the detected input data amount, the band control information for variably setting a band to be allocated to the data produced by the user data application is produced and outputted to the multiplexing means. The multiplexing means thus variably sets the ratio of bands to be allocated to the data and the compressed image and compressed speech in response to the band control information.

Since the band to be allocated to the user data in accordance with an operation situation of the user data application depending upon whether or not the user data is operating and in response to the input data amount inputted from the inputting means per unit time, the band for the user data upon multiplexing can be set freely, and consequently, the band for the user data can be set preferentially and the speed of response of the user data application can be raised.

According to another aspect of the present invention, there is provided a visual telephone apparatus, comprising speech compression means for compressing speech to be sent out to an object apparatus of communication, image compression means for compressing an image to be sent out to the object apparatus of communication, a user data application for producing data including at least character information to be sent out to the object apparatus of communication, inputting means for inputting the data to the user data application, multiplexing means for multiplexing the speech compressed by the speech compression means, the image compressed by the image compression means and the data produced by the user data application and sending out resulting multiplexed data to the object apparatus of communication, first detection means for detecting whether or not the user data application is operating, second detection means for detecting, when it is detected by the first detection means that the user data application is operating, an amount of input data inputted from the inputting means per unit time set in advance, and means for producing speech compression control information for setting a speech compression ratio of the speech compression means in response to a result of the detection of the second detection means and outputting the speech compression control information to the speech compression means.

In the visual telephone apparatus, the speech compression ratio is variably set depending upon whether or not the user data is operating and based on the input data amount of the inputting means such as a keyboard and/or a mouse per unit time. More particularly, it is detected whether or not the user data application is operating, and the input data amount inputted from the inputting means per unit time is detected. Then, in response to the detected input data amount, the control information for variably setting the speech compression ratio is produced and outputted to the speech compression section. The speech compression section thus variably sets the speech compression ratio in accordance with the control information.

Since the speech compression ratio when an inputted speech signal is to be compressed is determined in accordance with an operation situation of the user data application particularly depending upon whether or not the user data is operating and in response to the input data amount inputted from the inputting means per unit time, while the user application is operating, the band for the transmission compressed speech data upon multiplexing can be set low and the band for the user data can be set preferentially. Consequently, the speed of response of the user data application can be raised while preventing interruption of reproduction speech of the other party visual telephone apparatus.

According to a further aspect of the present invention, there is provided a visual telephone apparatus, comprising speech compression means for compressing speech to be sent out to an object apparatus of communication, image compression means for compressing an image to be sent out to the object apparatus of communication, a user data application for producing data including at least character information to be sent out to the object apparatus of communication, inputting means for inputting the data to the user data application, multiplexing means for multiplexing the speech compressed by the speech compression means, the image compressed by the image compression means and the data produced by the user data application and sending out resulting multiplexed data to the object apparatus of communication, first detection means for detecting whether or not the user data application is operating, second detection means for detecting, when it is detected by the first detection means that the user data application is operating, an amount of input data inputted from the inputting means per unit time set in advance, and means for producing image compression control information for setting an image compression ratio of the image compression means in response to a result of the detection of the second detection means and outputting the image compression control information.

In the visual telephone apparatus, the image compression ratio is variably set depending upon whether or not the user data is operating and based on the input data amount of the inputting means such as a keyboard and/or a mouse per unit time. More particularly, it is detected whether or not the user data application is operating, and the input data amount inputted from the inputting means per unit time is detected. Then, in response to the detected input data amount, the control information for variably setting the image compression ratio is produced and outputted to the image compression section. The image compression section thus variably sets the image compression ratio in accordance with the control information.

Since the image compression ratio when an inputted image signal is to be compressed is determined in accordance with an operation situation of the user data application particularly depending upon whether or not the user data is operating and in response to the input data amount inputted from the inputting means per unit time, while the user application is operating, the band for the transmission compressed image data upon multiplexing can be set low and the band for the user data can be set preferentially. Consequently, the speed of response of the user data application can be raised while preventing a drop of the frame rate of reproduction images of the other party visual telephone apparatus.

According to a still further aspect of the present invention, there is provided a data compression multiplexing method for a visual telephone apparatus which includes speech compression means for compressing speech to be sent out to an object apparatus of communication, image compression means for compressing an image to be sent out to the object apparatus of communication, a user data application for producing data including at least character information to be sent out to the object apparatus of communication, inputting means for inputting the data to the user data application, and multiplexing means for multiplexing the speech compressed by the speech compression means, the image compressed by the image compression means and the data produced by the user data application and sending out resulting multiplexed data to the object apparatus of communication, the data compression multiplexing method comprising the steps of detecting whether or not the user data application is operating, detecting, when it is detected that the user data application is operating, an amount of input data inputted from the inputting means per unit time set in advance, and producing band control information for setting a band to be allocated to the data produced by the user data application in response to a result of the detection and outputting the band control information to the multiplexing means.

According to a yet further aspect of the present invention, there is provided a data compression multiplexing method for a visual telephone apparatus which includes speech compression means for compressing speech to be sent out to an object apparatus of communication, image compression means for compressing an image to be sent out to the object apparatus of communication, a user data application for producing data including at least character information to be sent out to the object apparatus of communication, inputting means for inputting the data to the user data application, and multiplexing means for multiplexing the speech compressed by the speech compression means, the image compressed by the image compression means and the data produced by the user data application and sending out resulting multiplexed data to the object apparatus of communication, the data compression multiplexing method comprising the steps of detecting whether or not the user data application is operating, detecting, when it is detected that the user data application is operating, an amount of input data inputted from the inputting means per unit time set in advance, and producing speech compression control information for setting a speech compression ratio of the speech compression means in response to a result of the detection and outputting the speech compression control information to the speech compression means.

According to a yet further aspect of the present invention, there is provided a data compression multiplexing method for a visual telephone apparatus which includes speech compression means for compressing speech to be sent out to an object apparatus of communication, image compression means for compressing an image to be sent out to the object apparatus of communication, a user data application for producing data including at least character information to be sent out to the object apparatus of communication, inputting means for inputting the data to the user data application, and multiplexing means for multiplexing the speech compressed by the speech compression means, the image compressed by the image compression means and the data produced by the user data application and sending out resulting multiplexed data to the object apparatus of communication, the data compression multiplexing method comprising the steps of detecting whether or not the user data application is operating, detecting, when it is detected that the user data application is operating, an amount of input data inputted from the inputting means per unit time set in advance, and producing image compression control information for setting an image compression ratio of the image compression means in response to a result of the detection and outputting the image compression control information.

According to a yet further aspect of the present invention, there is provided a recording medium having recorded thereon a data compression multiplexing control program for a visual telephone apparatus which includes speech compression means for compressing speech to be sent out to an object apparatus of communication, image compression means for compressing an image to be sent out to the object apparatus of communication, a user data application for producing data including at least character information to be sent out to the object apparatus of communication, inputting means for inputting the data to the user data application, and multiplexing means for multiplexing the speech compressed by the speech compression means, the image compressed by the image compression means and the data produced by the user data application and sending out resulting multiplexed data to the object apparatus of communication, the data compression multiplexing control program causing control means for the speech compression means, the image compression means and the multiplexing means to detect whether or not the user data application is operating, detect, when it is detected that the user data application is operating, an amount of input data inputted from the inputting means per unit time set in advance, and produce band control information for setting a band to be allocated to the data produced by the user data application in response to a result of the detection and output the band control information to the multiplexing means.

According to a yet further aspect of the present invention, there is provided a recording medium having recorded thereon a data compression multiplexing control program for a visual telephone apparatus which includes speech compression means for compressing speech to be sent out to an object apparatus of communication, image compression means for compressing an image to be sent out to the object apparatus of communication, a user data application for producing data including at least character information to be sent out to the object apparatus of communication, inputting means for inputting the data to the user data application, and multiplexing means for multiplexing the speech compressed by the speech compression means, the image compressed by the image compression means and the data produced by the user data application and sending out resulting multiplexed data to the object apparatus of communication, the data compression multiplexing control program causing control means for the speech compression means, the image compression means and the multiplexing means to detect whether or not the user data application is operating, detect, when it is detected that the user data application is operating, an amount of input data inputted from the inputting means per unit time set in advance, and produce speech compression control information for setting a speech compression ratio of the speech compression means in response to a result of the detection and outputting the speech compression control information to the speech compression means.

According to a yet further aspect of the present invention, there is provided a recording medium having recorded thereon a data compression multiplexing control program for a visual telephone apparatus which includes speech compression means for compressing speech to be sent out to an object apparatus of communication, image compression means for compressing an image to be sent out to the object apparatus of communication, a user data application for producing data including at least character information to be sent out to the object apparatus of communication, inputting means for inputting the data to the user data application, and multiplexing means for multiplexing the speech compressed by the speech compression means, the image compressed by the image compression means and the data produced by the user data application and sending out resulting multiplexed data to the object apparatus of communication, the data compression multiplexing control program causing control means for the speech compression means, the image compression means and the multiplexing means to detect whether or not the user data application is operating, detect, when it is detected that the user data application is operating, an amount of input data inputted from the inputting means per unit time set in advance, and produce image compression control information for setting an image compression ratio of the image compression means in response to a result of the detection and outputting the image compression control information.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
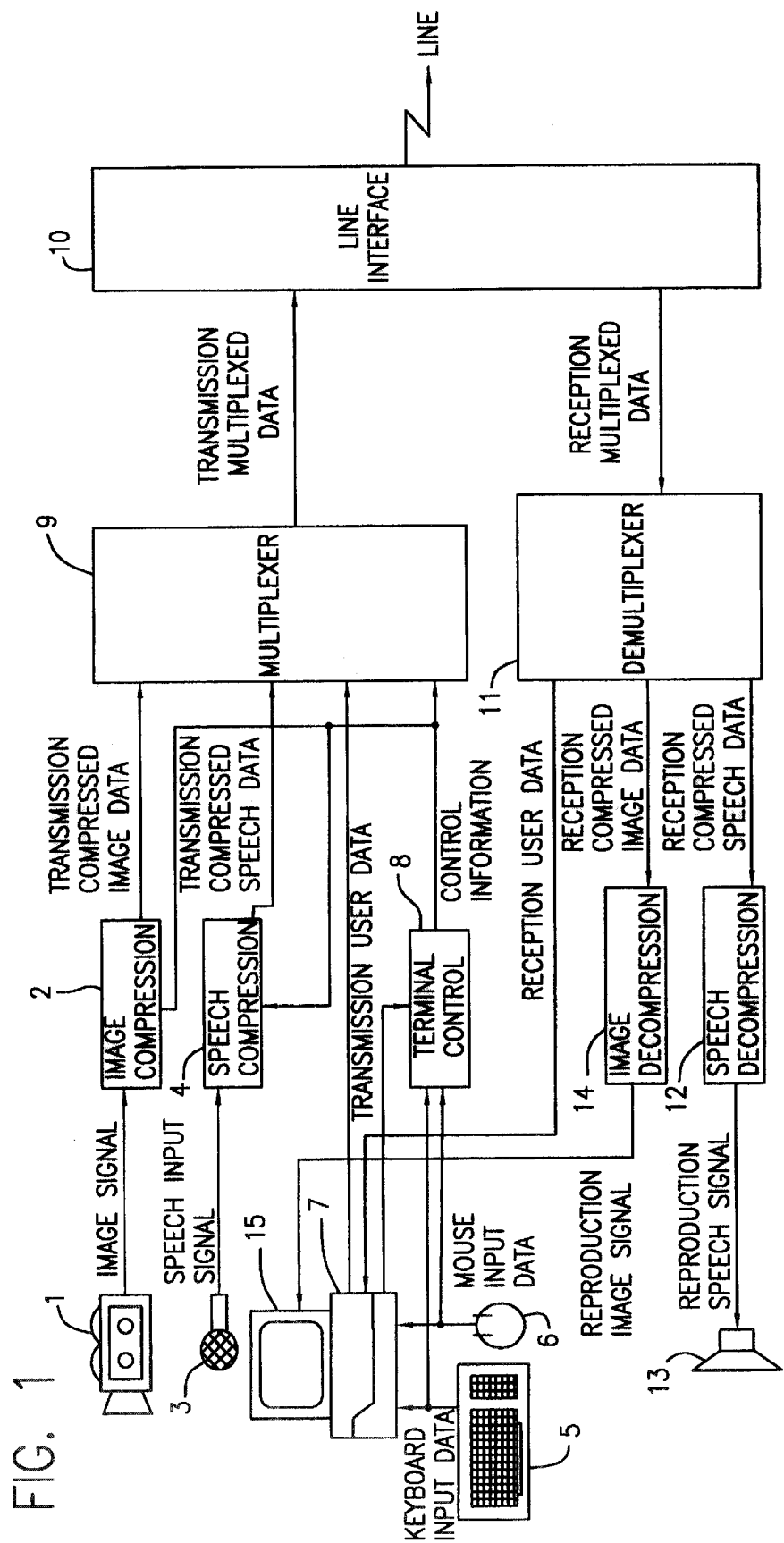
FIG. 1 is a block diagram showing a construction of a visual telephone apparatus to which the present invention is applied.

Referring first to FIG. 1, there is shown in block diagram a visual telephone apparatus to which the present invention is applied. The visual telephone apparatus shown includes a video camera 1, an image compression section 2, a microphone 3, a speech compression section 4, a keyboard 5, a mouse 6, a computer 7, a terminal control section 8, a multiplexer 9, a line interface 10, a demultiplexer 11, a speech decompression section 12, a speaker 13, an image decompression section 14, and a display unit 15.

The video camera 1 images an imaging object which is positioned in front of it, and outputs an image signal. The image compression section 2 receives the image signal outputted from the video camera 1 as an input thereto and outputs transmission compressed image data. The microphone 3 collects voice of a person who is positioned in front of it, and outputs a speech input signal. The speech compression section 4 receives the speech input signal outputted from the microphone 3 as an input thereto and outputs transmission compressed speech data.

The keyboard 5 outputs keyboard input data to the computer 7 and the terminal control section 8. The mouse 6 outputs mouse input data to the computer 7 and the terminal control section 8. The computer 7 receives the keyboard input data, the mouse input data and reception user data and outputs transmission shared data and common application operation information. The terminal control section 8 receives the keyboard input data from the keyboard 5, the mouse input data from the mouse 6 and the common application operation information from the computer 7, and outputs control information produced based on the data and information received to the image compression section 2, the speech compression section 4 and the multiplexer 9.

The multiplexer 9 receives transmission compressed image data from the image compression section 2, transmission compressed speech data from the speech compression section 4, transmission user data from the computer 7 and control information from the terminal control section 8 and outputs transmission multiplexed data to the line interface 10. The line interface 10 receives the transmission multiplexed data from the multiplexer 9 as an input thereto, interfaces inputting/outputting of line data from and to a visual telephone apparatus (not shown) of the other party over a line, and outputs reception multiplexed data to the demultiplexer 11.

The demultiplexer 11 receives reception multiplexed data from the line interface 10 as an input thereto and outputs reception user data, reception compressed image data and reception compressed speech data to the computer 7, image decompression section 14 and image compression section 2, respectively. The image decompression section 14 receives the reception compressed image data as an input thereto and outputs are production image signal to the display unit 15. The display unit 15 displays the reproduction image signal inputted thereto from the image decompression section 14.

The speech decompression section 12 receives reception compressed speech data from the demultiplexer 11 and outputs a reproduction speech signal to the speaker 13. The speaker 13 reproduces the reproduction speech signal inputted thereto from the speech decompression section 12 as speech.

Now, operation of the visual telephone apparatus of the embodiment of the present invention is described with reference to FIG. 1.

Figure 8:
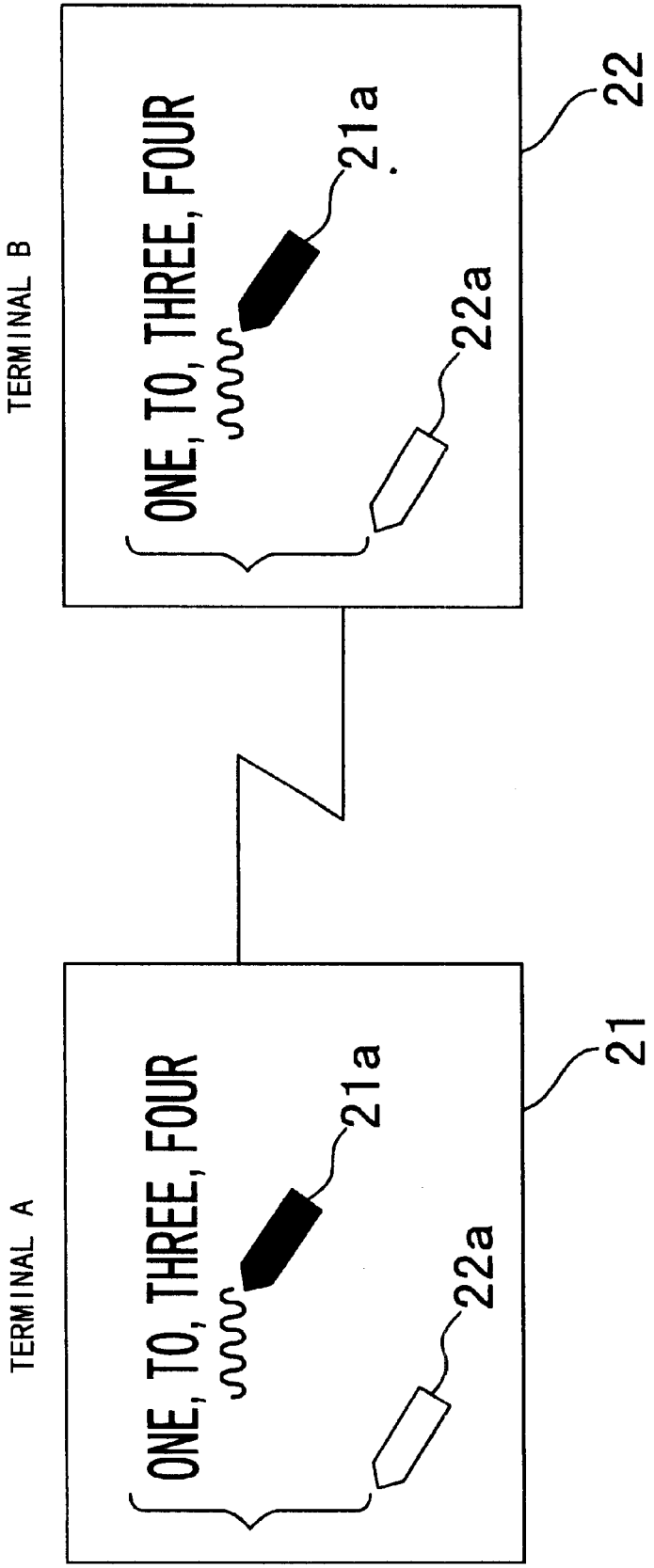
FIG. 8 is a schematic illustration showing a conventional shared white board.
Figure 9:
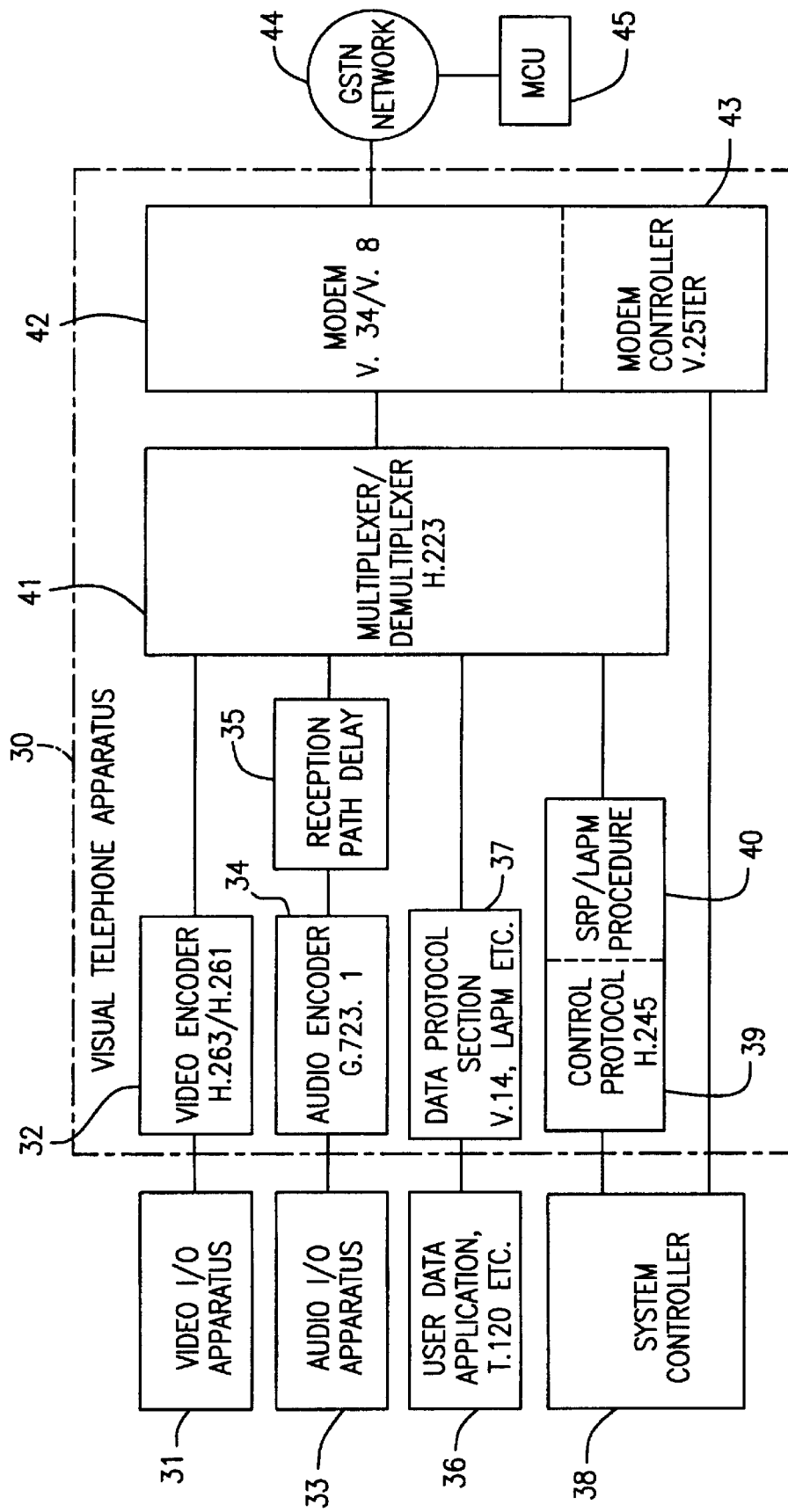
FIG. 9 is a block diagram showing a conventional visual telephone apparatus.

When a user data application (for example, the shared white board shown in FIG. 8) is not operating on the computer 7, an image signal of an imaging object imaged by the video camera 1 is subject to image compression processing by the image compression section 2. In this instance, the compression ratio by the image compression section 2 is determined in accordance with control information outputted from the terminal control section 8.

Similarly, a speech signal of a speaking person, who stands in front of the visual telephone apparatus, collected by the microphone 3 is subject to speech compression processing by the speech compression section 4. In this instance, the speech compression ratio in the speech compression section 4 is determined in accordance with control information outputted from the terminal control section 8.

Since no user data application is operating, the computer 7 does not output transmission user data to the multiplexer 9. When the terminal control section 8 recognizes based on common application operation information from the computer 7 that no user data application is operating, it outputs control information to set the image compression ratio and the speech compression ratio to their lowest values so that the bands for an image and speech in multiplexing processing may be allocated preferentially.

The multiplexer 9 performs multiplexing processing of transmission compressed image data and transmission compressed speech data based on the control information outputted from the terminal control section 8 and outputs transmission multiplexed data to the line interface 10. The transmission multiplex data include a multiplex table.

The line interface 10 transmits the transmission multiplexed data inputted thereto from the multiplexer 9 to the other party visual telephone apparatus over the line, and receives reception multiplexed data from the other party visual telephone apparatus and outputs the reception multiplexed data to the demultiplexer 11. The demultiplexer 11 demultiplexes the reception multiplexed data inputted thereto into reception compressed image data and reception compressed speech data based on the multiplex table included in the reception multiplexed data, and outputs the reception compressed image data and the reception compressed speech data to the image decompression section 14 and the speech decompression section 12, respectively.

Here, since no user data application is operating on the computer 7, the reception user data are not outputted. The speech decompression section 12 performs speech decompression processing for the reception compressed speech data inputted thereto and outputs a reproduction speech signal so that speech may be reproduced by the speaker 13. Meanwhile, the image decompression section 14 performs image decompression processing for the reception compressed image data inputted thereto and outputs a reproduction image signal so that an image may be reproduced by the display unit 15.

On the other hand, when a user data application is operating on the computer 7, an image signal of an imaging object imaged by the video camera 1 is subject to image compression processing by the image compression section 2. In this instance, the image compression ratio in the image compression section 2 is determined in accordance with control information outputted from the terminal control section 8.

Similarly, a speech signal of a speaking person, who stands in front of the visual telephone apparatus, collected by the microphone 3 is subject to speech compression processing by the speech compression section 4. In this instance, the speech compression ratio in the speech compression section 4 is determined in accordance with control information outputted from the terminal control section 8. As the user data application is operating on the computer 7 in accordance with keyboard input information and mouse input information, the computer 7 outputs transmission user data to the multiplexer 9 and simultaneously outputs common application operation information, which indicates that the user data application is operating, to the terminal control section 8.

When the terminal control section 8 recognizes from the common application operation information that the user data application is operating on the computer 7, it outputs control information to set the image compression ratio and the speech compression ratio to suitable values in response to the total data amount per unit time of the keyboard information and the mouse information inputted thereto from the keyboard 5 and the mouse 6, respectively, and decrease the allocations to the bands for an image and speech in multiplexing processing so that a band may be allocated preferentially to the user data application.

The multiplexer 9 performs multiplexing processing for the transmission compressed image data, transmission compressed speech data and transmission user data in accordance with the control information outputted from the terminal control section 8 and outputs transmission multiplexed data to the line interface 10. In this instance, since the user data application is operating on the computer 7, such multiplexing processing that the bands for an image and speech are set comparatively narrow while the band for user data is allocated preferentially is performed as described above. Similarly, the transmission multiplexed data include a multiplex table.

The line interface 10 transmits the transmission multiplexed data inputted thereto from the multiplexer 9 to the other party visual telephone apparatus over the line, and receives reception multiplexed data from the other party telephone apparatus and outputs the reception multiplexed data to the demultiplexer 11. The demultiplexer 11 demultiplexes the reception multiplexed data inputted thereto into reception compressed image data, reception compressed speech data and reception user data based on the multiplex table included in the reception multiplexed data and outputs the data to the image decompression section 14, the speech decompression section 12 and the computer 7 on which the user data application is operating, respectively.

The speech decompression section 12 performs speech decompression processing for the reception compressed speech data inputted thereto and outputs a reproduction speech signal to the speaker 13. The speaker 13 reproduces speech based on the reproduction speech signal. Meanwhile, the image decompression section 14 performs image decompression processing for the reception compressed image data inputted thereto and outputs a reproduction image signal to the display unit 15. The display unit 15 reproduces an image based on the reproduction image signal. Further, since the reception user data are inputted to the user data application, cooperation of the application can be realized.

Figure 2:
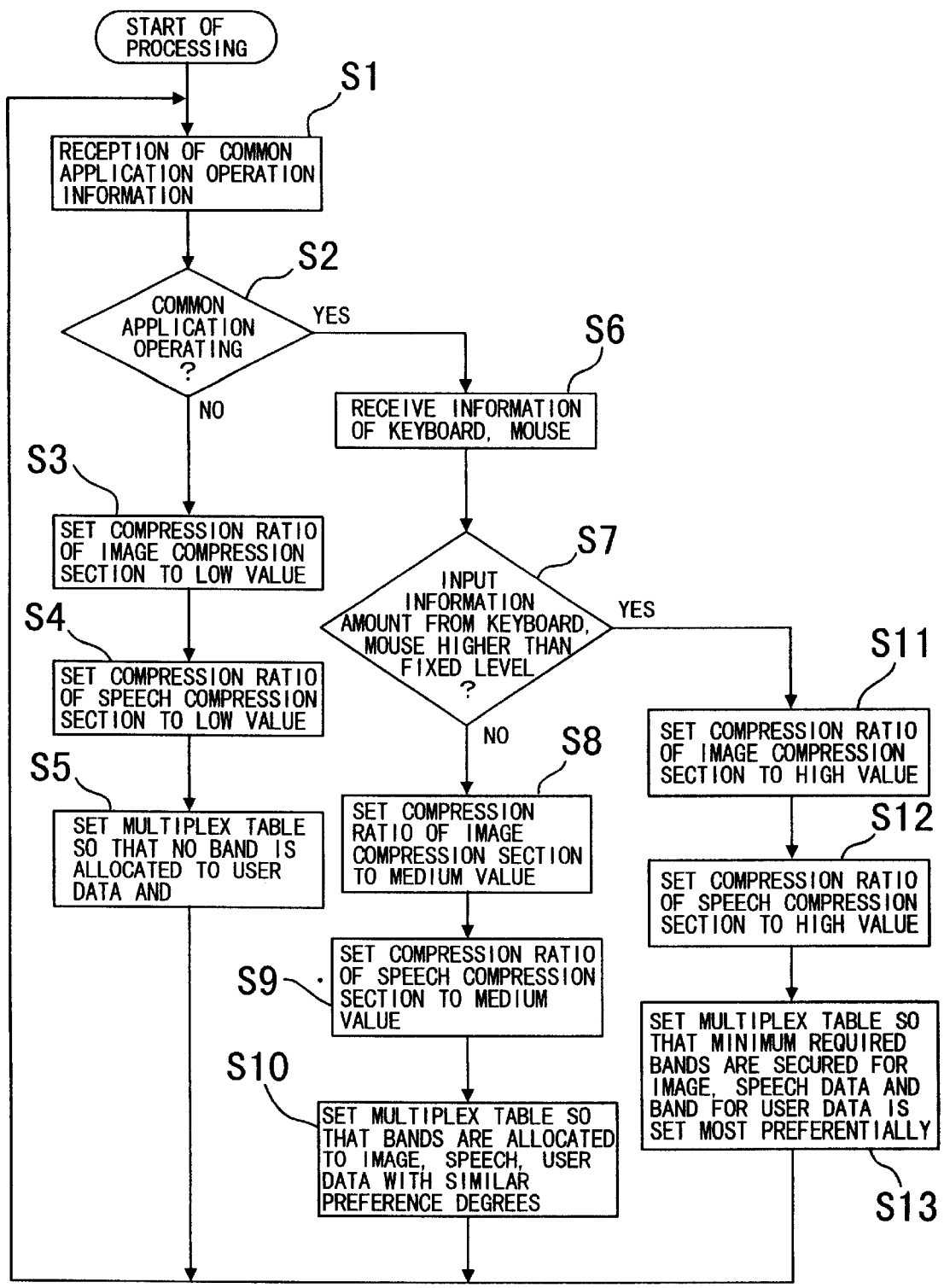
FIG. 2 is a flow chart illustrating operation of a terminal control section of the visual telephone apparatus of FIG. 1.

FIG. 2 is a flow chart illustrating operation of the terminal control section 8 shown in FIG. 1. The operation of the terminal control section 8 is described below with reference to FIGS. 1 and 2.

First, after processing is started, the terminal control section 8 receives common application operation information indicating that a user data application is operating (step S1 of FIG. 2). Here, if the user data application is not operating (step S2 of FIG. 2), then the terminal control section 8 outputs control information to the image compression section 2 to set the image compression ratio to a low value (step S3 of FIG. 2), outputs control information to the speech compression section 4 to set the speech compression ratio to a low value (step S4 of FIG. 2) and outputs control information to the multiplexer 9 to set so as to allocate a band only to transmission compressed image data and transmission compressed speech data in multiplexing processing (step S5 of FIG. 2). Thereafter, the terminal control section 8 returns its processing to step S1.

On the other hand, if a user data application is operating in step S2 described above, then the terminal control section 8 receives keyboard input data and mouse input data outputted from the keyboard 5 and the mouse 6, respectively (step S6 of FIG. 2).

Here, if the total amount of the keyboard input data and the mouse input data per unit time is smaller than a predetermined data amount (step S7 of FIG. 2), then the terminal control section 8 outputs control information to the image compression section 2 to set the image compression ratio to a medium value (step S8 of FIG. 2), outputs control information to the speech compression section 4 to set the speech compression ratio to a medium value (step S9 of FIG. 2) and outputs control information to the multiplexer 9 to set the bands for transmission compressed image data, transmission compressed speech data and transmission user data in multiplexing processing to similar values to each other (step S10 of FIG. 2). Thereafter, the terminal control section 8 returns its processing to step S1.

On the other hand, if the total amount of the keyboard input data and mouse input data per unit time is larger than the predetermined data amount mentioned above in step S7, then the terminal control section 8 outputs control information to the image compression section 2 to set the image compression ratio to a high value (step S11 of FIG. 2), outputs control information to the speech compression section 4 to set the speech compression ratio to a high value (step S12) and outputs control information to the multiplexer 9 to set the bands for transmission compressed image data and transmission compressed speech data in multiplexing processing narrower than the band for transmission user data (step S13 of FIG. 2). Thereafter, the terminal control section 8 returns its processing to step S1.

Figure 3:
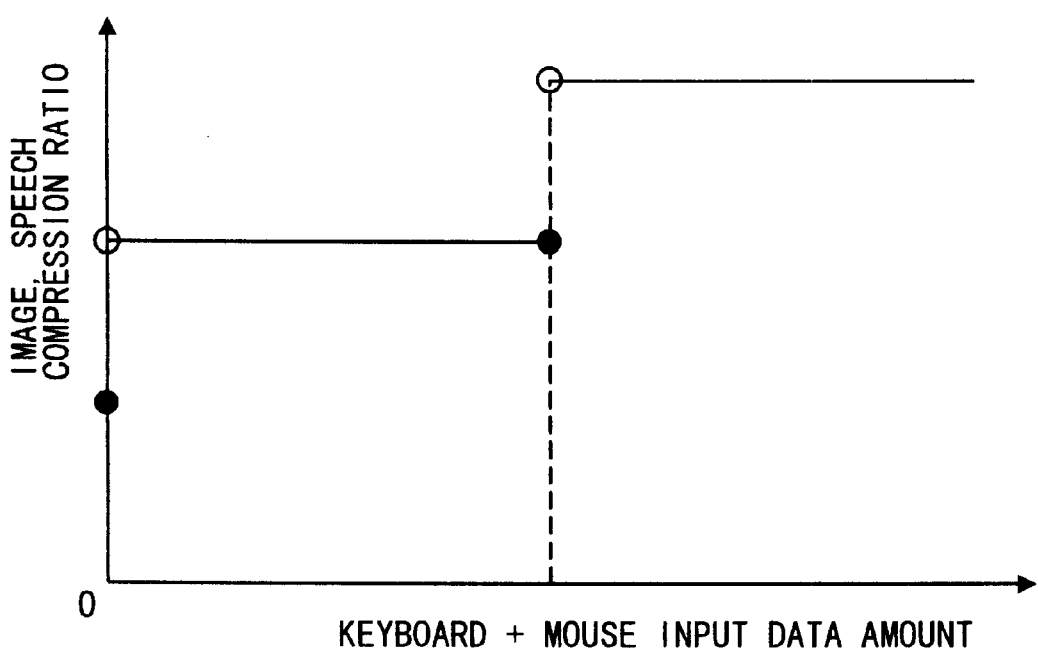
FIG. 3 is a diagram illustrating a relationship between the keyboard input data amount and mouse input data amount and the image compression ratio and speech compression ratio of the visual telephone apparatus of FIG. 1.

FIG. 3 illustrates a relationship between the keyboard input data amount and mouse input data amount and the image compression ratio and speech compression ratio of the visual telephone apparatus of FIG. 1. More particularly, FIG. 3 illustrates a relationship between the total amount of keyboard input data and mouse input data inputted per unit time to the terminal control section 8 and the compression ratios of the image compression section 2 and the speech compression section 4 set in accordance with the control information outputted from the terminal control section 8.

As seen from FIG. 3, when no user data application is operating and the input data amounts of the keyboard 5 and the mouse 6 per unit time are "0", the compression ratios to be set by the image compression section 2 and the speech compression section 4 are set to their lowest values.

On the other hand, when a user data application is operating, if the total input data amount of the keyboard 5 and the mouse 6 per unit time is equal to or smaller than a certain fixed level, then the compression ratios to be set by the image compression section 2 and the speech compression section 4 are set to medium values, but if the total input data amount is higher than the certain fixed level, then the compression ratios are set to their highest values.

Figure 4:
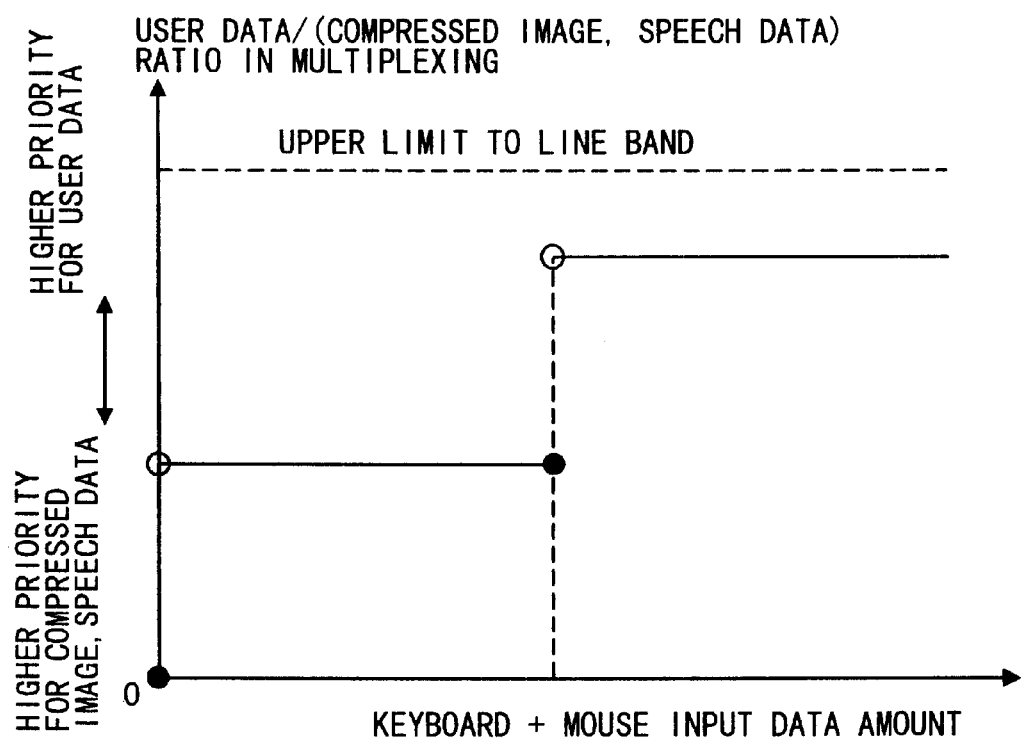
FIG. 4 is a diagram illustrating a ratio between the keyboard input data amount and mouse input data amount and the user data/compressed image and speech data in multiplexing of the visual telephone apparatus of FIG. 1.

FIG. 4 illustrates a ratio between the keyboard input data amount and mouse input data amount and the user data/compressed image and speech data in multiplexing of the visual telephone apparatus of FIG. 1. More particularly, FIG. 4 illustrates in graph a relationship between the total amount of keyboard input data and mouse input data inputted per unit time to the terminal control section 8 and ratios of bands for user data, transmission compressed image data and transmission compressed speech data of the multiplexer set in accordance with control information outputted from the terminal control section 8.

As seen from FIG. 4, when no user data application is operating and the input data amounts of the keyboard 5 and the mouse 6 per unit time are "0", the band to be allocated to the transmission user data is "0", and the entire band is allocated to the transmission compressed image data and transmission compressed speech data.

On the other hand, when a user data application is operating, if the total input data amount of the keyboard 5 and the mouse 6 per unit time is equal to or smaller than a certain fixed level, similar bands are allocated to the transmission user data, transmission compressed image data and transmission speech data. However, if the total input data mount of the keyboard 5 and the mouse 6 per unit time exceeds the certain fixed level, then the ratios of the bands to be allocated to the transmission user data, transmission compressed image data and transmission compressed speech data are set so that the band is allocated preferentially to the transmission user data.

As described above, with the visual telephone apparatus of the embodiment of the present invention described above, since the image compression ratio by the image compression section 2, the speech compression ratio by the speech compression section 4 and the band to be allocated to user data in the multiplexer 9 can be varied stepwise in response to whether or not a user data application is operating and in response to the input data amounts of the keyboard 5 and the mouse 6 per unit time, the speed of response of the user data application can be augmented without decreasing the frame rate of reproduction images and without interruption of reproduced speech while the visual telephone apparatus operates in a predetermined line band.

Figure 5:
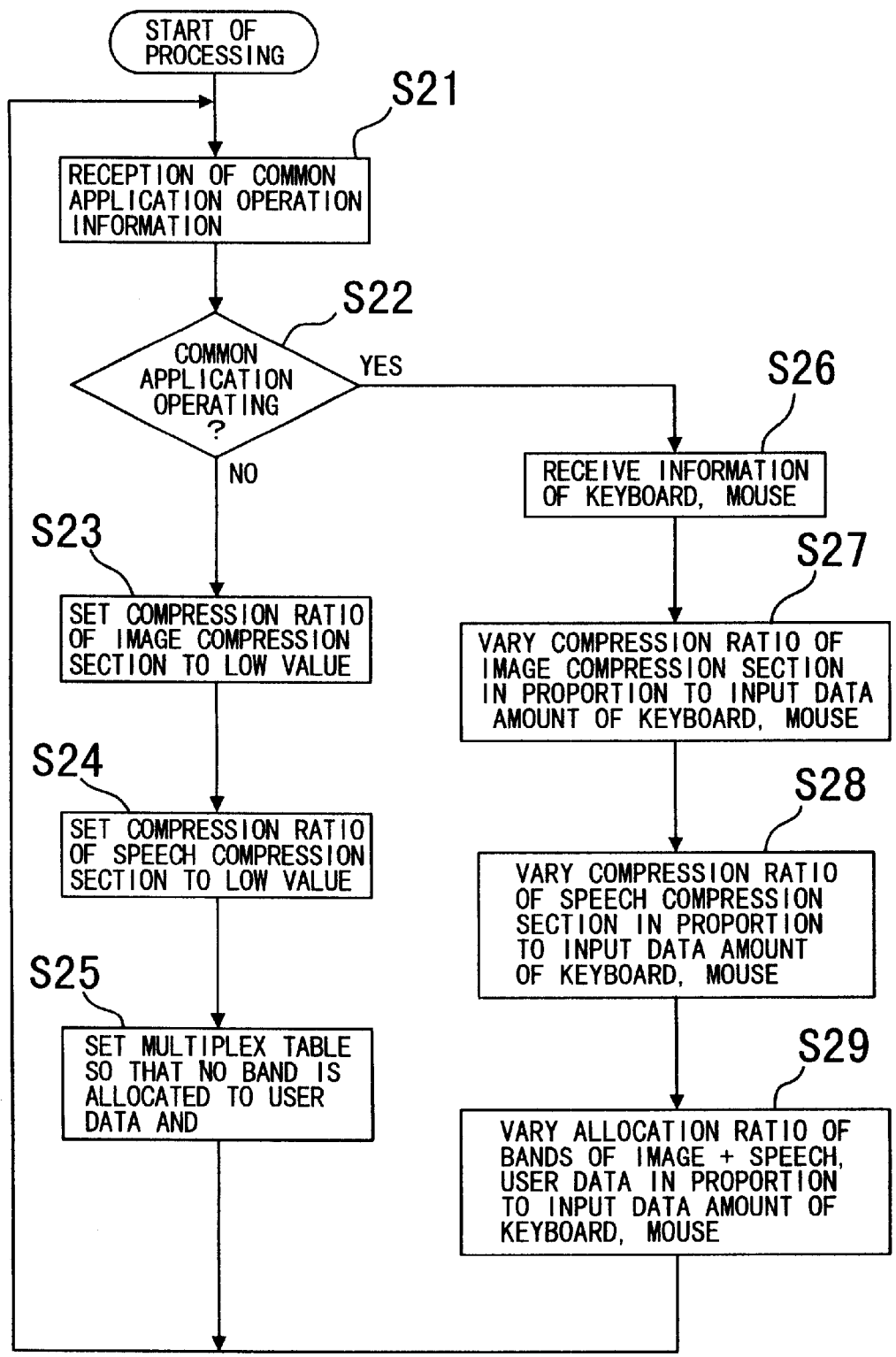
FIG. 5 is a flow chart illustrating different operation of the terminal control section of the visual telephone apparatus of FIG. 1.

FIG. 5 illustrates in flow chart alternative operation of the terminal control section of the visual telephone apparatus described above. Referring to FIG. 5, after processing of the terminal control section 8 is started, the terminal control section 8 receives common application operation information representing that a usr data application is operating (step S21 of FIG. 5). Here, if no user data application is operating (step S22 of FIG. 5), then the terminal control section 8 outputs control information to the image compression section 2 to set the image compression ratio low (step S23 of FIG. 25), outputs control information to the speech compression section 4 to set the speech compression ratio low (step S24 of FIG. 5) and outputs control information to the multiplexer 9 to set so that the bands are allocated only to transmission compressed image data and transmission compressed speech data in multiplexing (step S25 of FIG. 5). Thereafter, the terminal control section 8 returns its processing to step S21.

If a usr data application is operating in step S22 described above, then the terminal control section 8 receives keyboard input data and mouse input data outputted from the keyboard 5 and the mouse 6, respectively (step S26 of FIG. 5).

Here, the terminal control section 8 outputs control information to the image compression section 2 to variably and continuously or linearly vary the image compression ratio in response to the total data amount of the keyboard input data and the mouse input data per unit time (step S27 of FIG. 5), outputs control information to the speech compression section 4 to variably and continuously or linearly set the speech compression ratio in response to the total data amount of the keyboard input data and the mouse input data per unit time (step S28 of FIG. 5) and outputs control information to the multiplexer 9 to variably and continuously or linearly set the ratio of the bands of transmission compressed image data, transmission compressed speech data and transmission user data in response to the total data amount of the keyboard input data and the mouse input data per unit time (step S29 of FIG. 5). Thereafter, the terminal control section 8 returns its processing to step S21.

Figure 6:
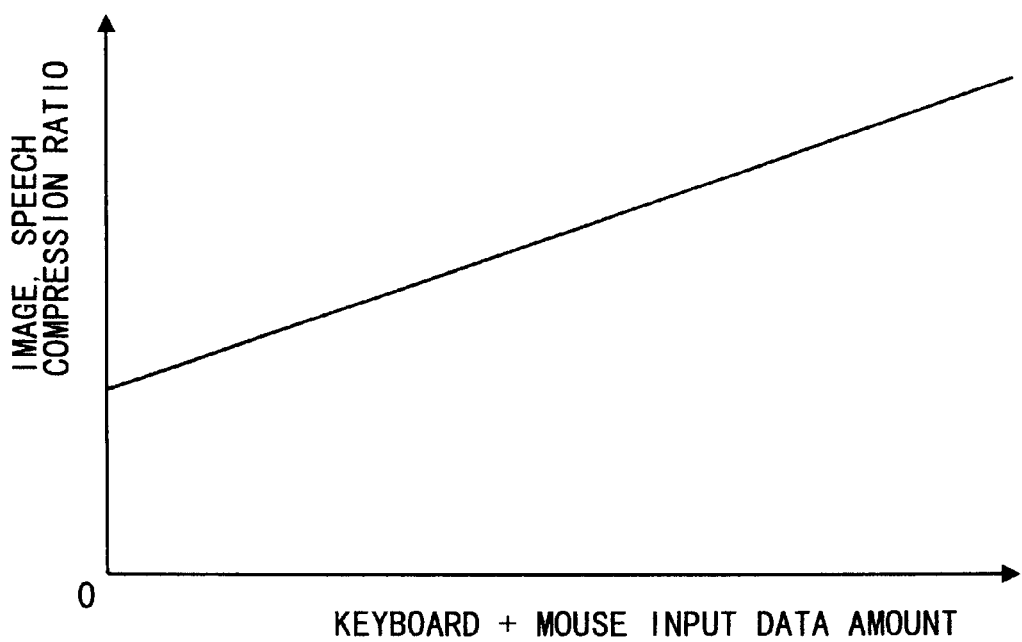
FIG. 6 is a diagram illustrating a relationship between the keyboard input data amount and mouse input data amount and the image compression ratio and speech compression ratio of the visual telephone apparatus of FIG. 1 where the terminal control section operates in accordance with the flow chart of FIG. 5.

FIG. 6 illustrates a relationship between the keyboard input data amount and mouse input data amount and the image compression ratio and speech compression ratio of the visual telephone apparatus of FIG. 1 when the terminal control section 8 operates in such a manner as described hereinabove with reference to FIG. 5. More particularly, FIG. 6 illustrates a relationship between the total amount of keyboard input data and mouse input data inputted per unit time to the terminal control section 8 and the compression ratios of the image compression section 2 and the speech compression section 4 set in accordance with the control information outputted from the terminal control section 8.

As seen from FIG. 6, when no user data application is operating and the total input data amount of the keyboard 5 and the mouse 6 per unit time is "0", the compression ratios to be set to the image compression section 2 and the speech compression section 4 are set to the lowest values.

On the other hand, when a user data application is operating, the image and speech compression ratios are set so as to continuously or linearly vary in response to the total data amount of the keyboard 5 and the mouse 6 per unit time.

Figure 7:
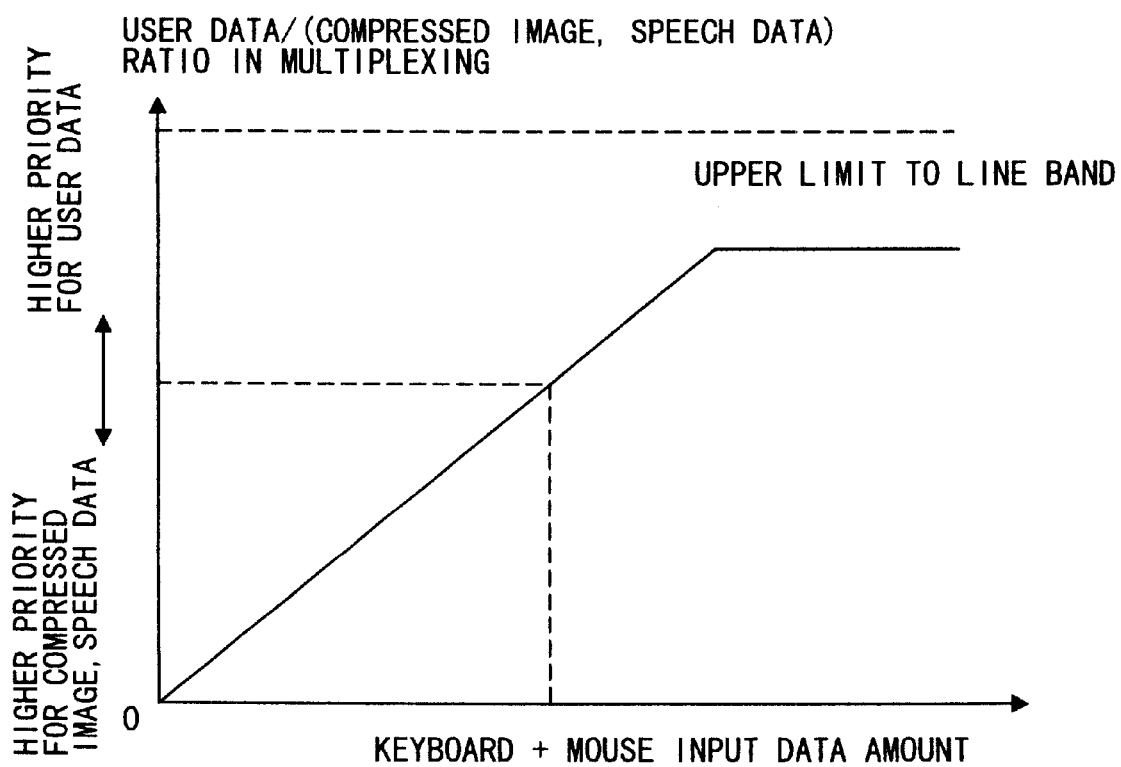
FIG. 7 is a diagram illustrating a ratio between the keyboard input data amount and mouse input data amount and the user data/compressed image and speech data in multiplexing of the visual telephone apparatus of FIG. 1 where the terminal control section operates in accordance with the flow chart of FIG. 5.

FIG. 7 illustrates a ratio between the keyboard input data amount and mouse input data amount and the user data/compressed image and speech data in multiplexing of the visual telephone apparatus of FIG. 1 when the terminal control section 8 operates in such a manner as described hereinabove with reference to FIG. 5. More particularly, FIG. 7 illustrates in graph a relationship between the total amount of keyboard input data and mouse input data inputted per unit time to the terminal control section 8 and ratios of bands for user data, transmission compressed image data and transmission compressed speech data of the multiplexer 9 set in accordance with control information outputted from the terminal control section 8.

As seen from FIG. 7, when no user data application is operating and the total input data amount of the keyboard 5 and the mouse 6 per unit time is "0", the band to be allocated to the transmission user data is "0", and the entire band is allocated to the transmission compressed image data and transmission compressed speech data.

On the other hand, when a user data application is operating, the ratio of the bands allocated to the transmission user data, transmission compressed image data and transmission compressed speech data is set so as to continuously or linearly vary in response to the total input data amount of the keyboard 5 and the mouse 6 per unit time.

As described above, with the visual telephone set of the embodiment of the present invention described above where the terminal control section 8 operates in such a manner as described above with reference to FIG. 5, since the image compression ratio by the image compression section 2, the speech compression ratio by the speech compression section 4 and the band to be allocated to user data in the multiplexer 9 can be set continuously or linearly and variably in response to whether or not a user data application is operating and in response to the total input data amount of the keyboard 5 and the mouse 6 per unit time, the speed of response of the user data application can be augmented without decreasing the frame rate of reproduction images and without interruption of reproduced speech while the visual telephone apparatus operates in a predetermined line band.

By detecting whether or not a user data application is operating and the total input data amount of the keyboard 5 and the mouse 6 per unit time by means of the terminal control section 8 and varying the band allocation to user data in multiplexing based on results of the detection by means of the multiplexer 9, the band for user data in multiplexing can be set freely and can thus be set preferentially, and the speed of response of the user data application can be made high.

Further, by varying the image compression ratio of the image compression section 2 based on the results of detection described above, the compression ratio for image compression can be set freely and the allocation to an image in multiplexing can be reduced while the band for user data can be set preferentially. Consequently, the speed of response of the user data application can be made high.

Furthermore, by varying the speech compression ratio of the speech compression section 4 based on the results of detection described above, the compression ratio for speech compression can be set freely and the allocation to speech in multiplexing can be reduced while the band for user data can be set preferentially. Consequently, the speed of response of the user data application can be made high.

While a preferred embodiment of the present invention has been described using specific terms, such description is for illustrative purposes only, and it is to be understood that changes and variations may be made without departing from the spirit or scope of the following claims.

What is claimed is:

1. A recording medium having recorded thereon a data compression multiplexing control program for a visual telephone apparatus which includes a speech compression circuit for compressing speech to be sent out to an object apparatus of communication, an image compression circuit for compressing an image to be sent out to the object apparatus of communication, a user data processing application; an input device for inputting data including character data to said user data application, a multiplexer for multiplexing the speech compressed by said speech compression circuit, the image compressed by said image compression circuit and data produced by said user data processing application and sending out resulting multiplexed data to the object apparatus of communication, and a control circuit, the data compression multiplexing control program causing said control circuit to:

detect whether or not said user data processing application is operating;

detect, when it is detected that said user data processing application is operating, an amount of input data inputted from said input device per a predetermined unit of time; and produce band control information for setting a band to be allocated to the data produced by said user data processing application in response to the detected amount of input data and output the band control information to said multiplexer.

2. A recording medium as claimed in claim 1, wherein the data compression multiplexing control program causes said control circuit to produce speech compression control information for setting a speech compression ratio of said speech compression circuit in response to the detected input data amount and output the speech compression control information to said speech compression circuit.

3. A recording medium as claimed in claim 2, wherein said speech compression circuit sets a speech compression ratio in speech compression processing in accordance with the speech compression control information.

4. A recording medium data as claimed in claim 1, wherein the data compression multiplexing control program causes said control circuit to produce image compression control information for setting an image compression ratio of said image compression circuit in response to the detected input data amount and outputting the image compression control information to said image compression circuit.

5. A recording medium as claimed in claim 4, wherein said image compression circuit sets an image compression ratio in image compression processing in accordance with the image compression control information.

6. A recording medium as claimed in claim 1, wherein said multiplexer sets a ratio between a band to be allocated to the data in multiplexing processing and bands to be allocated to the speech compressed by said speech compression circuit and the image compressed by said image compression circuit in accordance with the band control information.

7. A recording medium having recorded thereon a data compression multiplexing control program for a visual telephone apparatus which includes a speech compression circuit for compressing speech to be sent out to an object apparatus of communication, an image compression circuit for compressing an image to be sent out to the object apparatus of communication, a user data processing application, an input device for inputting data including character information to said user data processing application, a multiplexer for multiplexing the speech compressed by said speech compression circuit, the image compressed by said image compression circuit and data produced by said user data processing application and sending out resulting multiplexed data to the object apparatus of communication, and a control circuit, the data compression multiplexing control program causing the control circuit to:

detect whether or not said user data processing application is operating;

detect, when it is detected that said user data processing application is operating, an amount of input data inputted from said input device per a predetermined unit of time; and produce speech compression control information for setting a speech compression ratio of said speech compression circuit in response to the detected amount of input data and outputting the speech compression control information to said speech compression circuit.

8. A recording medium as claimed in claim 7, wherein said speech compression circuit sets the speech compression ratio in speech compression processing in accordance with the speech compression control information.

9. A recording medium having recorded thereon a data compression multiplexing control program for a visual telephone apparatus which includes a speech compression circuit for compressing speech to be sent out to an object apparatus of communication, an image compression circuit for compressing an image to be sent out to the object apparatus of communication, a user data processing application, an input device for inputting data to said user data processing application, a multiplexer for multiplexing the speech compressed by said speech compression circuit, the image compressed by said image compression circuit and data produced by said user data processing application and sending out resulting multiplexed data to the object apparatus of communication, and a control circuit, the data compression multiplexing control program causing the control circuit to:

detect whether or not said user data processing application is operating;

detect, when it is detected that said user data processing application is operating, an amount of input data inputted from said input device per a predetermined unit of time; and produce image compression control information for setting an image compression ratio of said image compression circuit in response to the detected amount of input data and outputting the image compression control information.

10. A recording medium as claimed in claim 9, wherein said image compression circuit sets the image compression ratio in image compression processing in accordance with the image compression control information.

11. A visual telephone apparatus comprising:

a speech compression circuit operative to compress data representing speech to be transmitted through a communication network;

an image compression circuit operative to compress data representing an image to be transmitted through the communication network;

a data processing circuit which implements a user data processing application;

a data input circuit operable to input user data including character information to the data processing circuit;

a multiplexer operative to multiplex data outputs of the speech compression circuit, the image compression circuit and the data processing circuit for transmission through the communication network;

a first detection circuit operative to provide an output when the user data processing application is operating;

a second detection circuit responsive to the output of the first detection circuit to generate a signal representing a data rate of user data inputted from the input circuit over a predetermined time interval; and a first control circuit responsive to the user data rate signal to allocate bandwidth for the data output of the data processing circuit relative to the data outputs of the speech compression circuit and the image compression circuit in an output signal generated by the multiplexer.

12. A visual telephone apparatus as claimed in claim 11, further comprising:

a second control circuit responsive to the user data rate signal to control the compression ratio of the data output of the speech compression circuit.

13. A visual telephone apparatus as claimed in claim 11, further comprising:

a third control circuit responsive to the user data rate signal to control the compression ratio of the data output of the image compression circuit.

14. A visual telephone apparatus as claimed in claim 11, wherein the multiplexer is operative to set a ratio between the bandwidth allocated for the data outputs of the data processing circuit, the speech compression circuit and the image compression circuit in the output signal generated by the multiplexer according to the user data rate signal.

15. A visual telephone apparatus as claimed in claim 14, further comprising:

a second control circuit responsive to the user data rate signal to control the compression ratio of the data output of the speech compression circuit according to the user data rate signal.

16. A visual telephone apparatus as claimed in claim 15, further comprising:

a third control circuit responsive to the user data rate signal to control the compression ratio of the data output of the image compression circuit according to the user data rate signal.

17. A visual telephone apparatus comprising:

a speech compression circuit operative to compress data representing speech to be transmitted through a communication network;

an image compression circuit operative to compress data representing an image to be transmitted through the communication network;

a data processing circuit which implements a user data processing application;

a data input circuit operable to input user data including character information to the data processing circuit;

a multiplexer operative to multiplex data outputs of the speech compression circuit, the image compression circuit and the data processing circuit for transmission through the communication network;

a first detection circuit operative to provide an output when the user data processing application is operating;

a second detection circuit responsive to the output of the first detection circuit to generate a signal representing a data rate of user data inputted from the input circuit over a predetermined time interval; and a first control circuit responsive to the user data rate signal to control the compression ratio of the data output of the speech compression circuit according to the user data rate signal.

18. A visual telephone apparatus as claimed in claim 17, further comprising:

a second control circuit responsive to the user data rate signal to control the compression ratio of the data output of the image compression circuit according to the user data rate signal.

19. A visual telephone apparatus comprising:

a speech compression circuit operative to compress data representing speech to be transmitted through a communication network;

an image compression circuit operative to compress data representing an image to be transmitted through the communication network;

a data processing circuit which implements a user data processing application;

a data input circuit operable to input user data including character information to the data processing circuit;

a multiplexer operative to multiplex data outputs of the speech compression circuit, the image compression circuit and the data processing circuit for transmission through the communication network;

a first detection circuit operative to provide an output when the user data processing application is operating;

a second detection circuit responsive to the output of the first detection circuit to generate a signal representing a data rate of user data inputted from the input circuit over a predetermined time interval; and a first control circuit responsive to the user data rate signal to control the compression ratio of the data output of the image compression circuit.

20. A multiplexing method for a visual telephone apparatus including a speech compression circuit operative to compress data representing speech to be transmitted through a communication network, an image compression circuit operative to compress data representing an image to be transmitted through the communication network, a data processing circuit which implements a user data processing application, a data input circuit operable to input user data including character information to the data processing circuit, and a multiplexer operative to multiplex data outputs of the speech compression circuit, the image compression circuit and the data processing circuit for transmission through the communication network, the method comprising the steps of:

detecting when the user data processing application is operating;

when the user data processing application is operating, detecting a data rate of user data inputted from the input circuit over a predetermined time interval; and controlling the multiplexer according to the detected user data rate to allocate bandwidth for the data output of the data processing circuit relative to the data outputs of the speech compression circuit and the image compression circuit in an output signal generated by the multiplexer.

21. A method as claimed in claim 20, further comprising the step of:

controlling the compression ratio of the data output of the speech compression circuit according to the detected user data rate.

22. A method as claimed in claim 20, further comprising the step of:

controlling the compression ratio of the data output of the image compression circuit according to the detected user data rate.

23. A method as claimed in claim 20, further comprising the step of setting a ratio between the bandwidth allocated for the data outputs of the data processing circuit, the speech compression circuit and the image compression circuit in the output signal generated by the multiplexer according to the detected user data rate.

24. A method as claimed in claim 23, further comprising the step of controlling the compression ratio of the data output of the speech compression circuit according to the detected user data rate.

25. A method as claimed in claim 24, further comprising the step of controlling the compression ratio of the data output of the image compression circuit according to the detected user data rate.

26. A multiplexing method for a visual telephone apparatus which includes a speech compression circuit operative to compress data representing speech to be transmitted through a communication network, an image compression circuit operative to compress data representing an image to be transmitted through the communication network, a data processing circuit which implements a user data processing application, a data input circuit operable to input user data including character information to the data processing circuit, and a multiplexer operative to multiplex data outputs of the speech compression circuit, the image compression circuit and the data processing circuit for transmission through the communication network, the method comprising the steps of:

detecting when the user data processing application is operating;

when the user data processing application is operating, detecting a data rate of user data inputted from the input circuit over a predetermined time interval; and controlling the compression ratio of the data output of the speech compression circuit according to the detected user data rate.

27. A method as claimed in claim 26, further comprising the step of:

controlling the compression ratio of the data output of the image compression circuit according to the detected user data rate.

28. A multiplexing method for a visual telephone apparatus which includes a speech compression circuit operative to compress data representing speech to be transmitted through a communication network, an image compression circuit operative to compress data representing an image to be transmitted through the communication network, a data processing circuit which implements a user data processing application, a data input circuit operable to input user data including character information to the data processing circuit, and a multiplexer operative to multiplex data outputs of the speech compression circuit, the image compression circuit and the data processing circuit for transmission through the communication network, the method comprising the steps of:

detecting when the user data processing application is operating;

when the user data processing application is operating, detecting a data rate of user data inputted from the input circuit over a predetermined time interval; and controlling the compression ratio of the data output of the image compression circuit according to the detected user data rate.

29. A visual telephone apparatus comprising:

a speech compression circuit operative to compress data representing speech to be transmitted through a communication network;

an image compression circuit operative to compress data representing an image to be transmitted through the communication network;

a data processing circuit which implements a user data processing application;

a data input circuit operable to input user data including character information to the data processing circuit;

a multiplexer operative to multiplex data outputs of the speech compression circuit, the image compression circuit and the data processing circuit for transmission through the communication network;

a detection circuit operative to generate a signal representing a data rate of user data inputted from the input circuit over a predetermined time interval; and a control circuit responsive to the user data rate signal to give transmission priority to the user data the speech data and the image data such that the user data is transmitted with the least possible delay when the user data rate exceeds a predetermined level, and to give priority to the speech data and the image data over the user data such that the speech data and the image data are transmitted with highest possible quality when the user data rate does not exceed the predetermined level.

30. A visual telephone apparatus as claimed in claim 29, wherein the control circuit operates the multiplexer to increase bandwidth allocated to the data output of the user data processing circuit relative to the data outputs of the speech compression circuit and the image compression circuit when transmission priority is given to the data output of the data processing circuit.

31. A visual telephone apparatus as claimed in claim 29, wherein the control circuit operates the speech compression circuit to increase the compression ratio of the speech data when transmission priority is given to the data output of the data processing circuit.

32. A visual telephone apparatus as claimed in claim 29, wherein the control circuit operates the image compression circuit to increase the compression ratio of the image data when transmission priority is given to the data output of the data processing circuit.

33. A visual telephone apparatus as claimed in claim 29, wherein the control circuit operates the multiplexer to set a ratio between the bandwidth allocated for the data outputs of the data processing circuit, the speech compression circuit and the image compression circuit in the output signal generated by the multiplexer according to the detected user data rate.

34. A visual telephone apparatus as claimed in claim 33, wherein the control circuit is operative to control the compression ratio of the data output of the speech compression circuit according to the detected user data rate.

35. A visual telephone apparatus as claimed in claim 34, wherein the control circuit is operative to control the compression ratio of the data output of the image compression circuit according to the detected user data rate.

36. A visual telephone apparatus as claimed in claim 33, wherein the control circuit is operative to control the compression ratio of the data output of the image compression circuit according to the detected user data rate.

37. A multiplexing method for a visual telephone apparatus which includes a speech compression circuit operative to compress data representing speech to be transmitted through a communication network, an image compression circuit operative to compress data representing an image to be transmitted through the communication network, a data processing circuit which implements a user data processing application, a data input circuit operable to input user data including character information to the data processing circuit, and a multiplexer operative to multiplex data outputs of the speech compression circuit, the image compression circuit and the data processing circuit for transmission through the communication network, the method comprising the steps of:

detecting a data rate of user data inputted from the input circuit over a predetermined time interval; and controlling the speech data compression circuit, the image compression circuit, and the multiplexer to give transmission priority to the user data over the speech data and the image data such that the user data is transmitted with the least possible delay when the user data rate exceeds a predetermined level, and to give priority to the speech data and the image data over the user data such that the speech data and the image data are transmitted with highest possible quality when the user data rate does not exceed the predetermined level.

38. The multiplexing method as claimed in claim 37, wherein the step of controlling the speech data compression circuit, the image compression circuit, and the multiplexer comprises increasing the bandwidth allocated to the user data relative to the compressed speech data and the compressed image data compression circuit in an output signal generated by the multiplexer when transmission priority is given to the user data.

39. The multiplexing method as claimed in claim 37, wherein the step of controlling the speech data compression circuit, the image compression circuit, and the multiplexer comprises increasing the compression ratio of the data output of the speech compression circuit when transmission priority is given to the user data.

40. The multiplexing method as claimed in claim 37, wherein the step of controlling the speech data compression circuit, the image compression circuit, and the multiplexer comprises increasing the compression ratio of the data output of the image compression circuit when transmission priority is given to the user data.

41. The multiplexing method as claimed in claim 40, wherein the step of controlling the speech data compression circuit, the image compression circuit, and the multiplexer comprises increasing the compression ratio of the data output of the speech compression circuit when transmission priority is given to the user data.

* * * * *